(12) United States Patent
Coura et al.

(10) Patent No.: US 6,305,665 B1
(45) Date of Patent: Oct. 23, 2001

(54) BELLOWS FOR SEALING A VALVE ROD PASSAGE IN A GLOBE VALVE

(75) Inventors: Herbert Robert Coura, Büchen; Wolfgang Rauen, Weite Welt/Seedorf; Martin Sauer, Kaisheim; Werner Schmid, Heidenheim, all of (DE)

(73) Assignee: Tuchenhagen GmbH, Buchen (DE)

( * ) Notice: Subject to any disclaimer, the term of this patent is extended or adjusted under 35 U.S.C. 154(b) by 0 days.

(21) Appl. No.: 09/647,262

(22) PCT Filed: Apr. 10, 1999

(86) PCT No.: PCT/EP99/02435

§ 371 Date: Sep. 26, 2000

§ 102(e) Date: Sep. 26, 2000

(87) PCT Pub. No.: WO99/53231

PCT Pub. Date: Oct. 21, 1999

(30) Foreign Application Priority Data

| Apr. 11, 1998 | (DE) | 198 16 378 |
| Oct. 14, 1998 | (DE) | 198 47 294 |
| Feb. 12, 1999 | (DE) | 199 05 831 |
| Mar. 17, 1999 | (EP) | 99105410 |

(51) Int. Cl.$^7$ ................................................ F16K 31/00
(52) U.S. Cl. ........................................ 251/335.3; 251/319
(58) Field of Search ........................ 251/335.3, 335.1, 251/318, 319, 330

(56) References Cited

U.S. PATENT DOCUMENTS

| 2,691,773 | 10/1954 | Lichtenberger | 340/242 |
| 4,687,017 | * 8/1987 | Danko et al. | 137/315 |
| 5,056,759 | * 10/1991 | Schlesch | 251/330 |
| 5,641,148 | * 6/1997 | Pena et al. | 251/129.07 |
| 6,192,924 | * 2/2001 | McNeely et al. | 137/489.5 |

FOREIGN PATENT DOCUMENTS

| 91 16 465.6 | 12/1920 | (DE) . |
| 29 49 860 | 6/1981 | (DE) . |
| 32 15 799 | 1/1983 | (DE) . |
| 41 01 860 | 11/1991 | (DE) . |
| 42 43 111 | 6/1994 | (DE) . |
| 44 19 487 | 12/1995 | (DE) . |
| 0 508 658 | 9/1996 | (EP) . |

* cited by examiner

*Primary Examiner*—Kevin Shaver
*Assistant Examiner*—D A Bonderer
(74) *Attorney, Agent, or Firm*—Vidas, Arrett & Steinkraus, P.A.

(57) ABSTRACT

The invention relates to a bellows to seal a valve rod passage in a lifting valve, specifically formed as an expansion bellows or corrugated tube, which ensures a reliable, hygienically proper and durable static sealing of the connecting flange of a closing-member unit in the box of the lifting valve under the occurring forces at an adequately long service life. This is achieved by the fact that the connecting flange (40) of the closing-member unit (4), in the region where it is connected to the bellows (4b), has a fastening component (4f) indirectly supported on the box side to absorb, in a way free from bending moments to a very large extent, the forces resulting from the valve-lift induced deformation of the bellows (4b) and/or the respective pressure in the box (1a) and is reduced, in the area of its conical sealing surface (4h), to a minimal wall thickness meeting the strength-related requirements, in the form of a diaphragm-shaped sealing element (4l), and that the diaphragm-shaped sealing element (4l), on its side facing away from the conical sealing surface (4h) has at least one biased elastic thrust ring (5) which presses the sealing surface (4h) onto the complementary annular seating surface (1k).

21 Claims, 7 Drawing Sheets

BELLOWS FOR SEALING A VALVE ROD PASSAGE IN A GLOBE VALVE

CROSS-REFERENCE TO RELATED APPLICATIONS

Not Applicable

STATEMENT REGARDING FEDERALLY SPONSORED RESEARCH

Not Applicable

BACKGROUND OF THE INVENTION

This invention relates to a lifting valve including a bellows to seal a valve rod passage.

Lifting valves of the generic type preferably are designed as shut-off valves and are used according. At this point, at least one component of the aperture and closing motions of the closing component is directed perpendicularly to the end surfaces, the seating surfaces. The passage of the valve rod actuating the closing component through the valve box is spanned by a bellows which concentrically encircles the valve rod. This bellows which may be formed as an expansion bellows (DE 32 15 799 C2), a corrugated tube or a diaphragm (EP 0 508 658 B1) extends, as a rule, from the closing component up to that portion of the valve box which is traversed by the valve rod.

Such a valve rod sealing by means of a bellows has the advantage that there is no sealing gap between the valve rod adapted to slide in an axial direction and the stationary valve box, into which a product carry-over can take place because of the motion of the valve rod relative to the valve box. It is known that such sealing gaps pose sanitary problem zones in which germ or bacteria formation may occur, which will then provoke reinfections of the product in the valve box because of the valve rod motion, the so-called "elevator effect".

Using a bellows to seal the passage of a valve rod is compulsory for high sanitary requirements especially in the aseptic range of the pharmaceutical chemical, or foodstoff-processing industries. From the aforementioned DE 32 15 799 C2, an aseptic valve has been known which has a closing component cooperating with a conical seating in a valve box with an appropriate annular sealing surface with the closing component being connected to a servo-drive via a screw and is joined to an expansion bellows coaxially encircling the screw and constituting the screw seating which, at its free end, has a connecting flange adapted to be locked in place between the valve box proper and a valve lantern with a conical sealing surface which bears against a complementary annular seating surface of the box surface which bears against a complementary annular seating surface of the box where the closing piece, the expansion bellows, and its connecting flange form a rotation-symmetrical replacement unit which is exchangeable as a whole and is open to the top. This so-called replacement unit is made of a polytetrafluoroethylene material (PTFE such as Teflon) which, as positive properties, exhibits high elasticity, resistance to chemicals, and a long service life while putting up with relatively large plastic ductility (heavy propension to "flow" or "creep").

The aforementioned replacement unit, amongst other things, has the two problem zones which now are indicated.

1. The connecting flange, along with its conical sealing surface, defines a sensible annular gap in an interaction with its complementary annular seating surface in the valve box. In order that this annular gap between the connecting flange and the stationary valve box parts bordering it on the other side permanently remain tight and do not "work" under varying conditions of operation (pressure and temperature) the connecting flange is squeezed between the valve box and a box closing component (box top), i.e. the connecting flange is kept under a bias in its locked position. It is known now that the material preferably used for the replacement unit at the beginning (PTFE) tends to exhibit a certain creep behaviour under varying pressures and temperatures, as seen over a prolonged period of time, which causes the shape of the connecting flange to slightly change. In operation, this causes the bias which prevents an expansion of the sealing gap and is produced by the squeezing action to gradually diminish and the sealing gap to "work". This might cause a product to penetrate in the "breathing" sealing gap with the aforementioned consequences of product carry-over and subsequent reinfection.

2. The expansion bellows which has been known from DE 32 15 799 C2 is an integral part of the so-called replacement unit which may be exchanged in the valve, if required. To this end, it is necessary that the box aperture and, hence, the measure of the connecting flange which corresponds thereto be designed at least as large as the outer diameter of the closing component. As is shown in FIG. 2 of the aforementioned document the tensile forces acting onto the connecting flange if the expansion bellows is under a tensile stress and the reaction forces directed counter to these forces are not situated on a joint line of action at the locking point of the connecting flange, but are at a radial spacing from each other. This spacing and, hence, the bending moment produced by this couple of forces will even be increased, as a rule, because efforts are made to dimension the expansion bellows so as to be as small as possible for reasons of strength. This causes the point of application of the tensile force exerted by the expansion bellows onto the connecting flange to migrate further inwardly in a radial direction so that the aforementioned radial spacing between the two forces and, therefore, the bending moment will continue to increase.

The bending moment just discussed will now lead to the fact that the connecting flange squeezed between the box and the box closing component apart from being subjected to this squeezing stress, also experiences a bending stress which provokes an increased strain on the material and, hence, an intensified change in shape in this region. This aggravates the critical situation previously described with reference to the sealing gap under item 1.

In the document EP 0 508 658 B1 also mentioned at the beginning, in which an aseptic valve construction is described with a bellows of the generic type, the aforementioned problem existing in the region of the critical sealing gap on the conical sealing surface of the connecting flange was discussed as a subject already. To mitigate the problem encountered, a suggestion is made there that the complementary annular shoulder seating in the valve box which corresponds to the conical sealing surface of the connecting flange in the valve box should have a lip completely inside which is inclined downwardly from the inwardly and upwardly inclined annular surface of the valve box. Such a measure may possibly prevent the sealing gap from being expanded prematurely. However, it constitutes no long-lasting measure because if the bellows material creeps at this point the bias required will diminish as well and will not be permanently ensured by any further recognizable measures.

A satisfactory solution to this problem may be successful only if the influencing factors which were described as being adverse under items 1 and 2 above can be reduced and/or if they can be counteracted by appropriate measures.

The expansion bellows which has been known from DE 32 15 799 C2 encircles the valve rod at a relatively large radial clearance. Although the latter allows a view into and makes possible an intervention in the interior of the bellows in case of need and, thus, possibly favours a detection of a bellows defect on time it is rather infavourable with respect to the stability of the bellows because of an attack of the flow and squeezing forces from the space enclosing the bellows. A conditional remedy may be provided here either by decreasing the bellows diameter in the region of the bellows folds or increasing the rod diameter. The first action, however, leads to a larger stress on the box-end connecting flange of the expansion bellows at a bending moment, which stresses the critical gap between the conical sealing surface of the connecting flange and its complementary annular seating surface in the box in a dynamically alternating way. As a result of the existing propension of the bellows material to flow at a high product pressure and/or high product temperature, there is a risk of gap expansion and product penetration into this region with all of the adverse consequences known, amongst which are germ formation and product reinfection.

Leaving out attention to the aforementioned gap problems in the region of the connecting flange for a moment and directing attention exclusively to an increase in bellows stability in the region of the bellows folds such increase may be obtained by a decrease in the break between the bellows folds and the valve rod, either by reducing the bellows diameter or, if the bellows diameter is not changed, by a supporting action from the inside, e.g. by increasing the rod diameter or by retracting the supporting tube which tightly borders the bellows (DE 42 43 111 A1).

A supporting action from the inside has shown that if bellows materials are used which have a strong propension to undergo durable deformation, so-called "creeping", when under a stress, such as polytetrafluoroethylene, the bellows fold regions adjoining the rod come to increasingly bear against the rod or the supporting pipe because of this permanent deformation so that the respective fold interior which is bordered by the bellows fold, on one hand, and the rod or supporting pipe itself in the inside region, on the other, defines a self-contained cavern from which the medium enclosed therein cannot or can insufficiently escape. The medium enclosed can either be a check medium with which the interior of the bellows is filled and which can be detected via suitable devices, or leaking media which enter the interior of the bellows and result from a defect in the bellows (e.g. a product). This puts in question any dependable and up-to-date indication of a bellows defect or its instant detection.

As a result of the axial shift of the rod, there is a relative motion between the expansion bellows and the rod, which approaches the zero at the point connecting the bellows to the rod and has its maximum rate at the box-side end of the bellows. As the bellows folds bear against the rod this relative motion is impeded because there is a friction between the bellows fold and the rod, This can go so far that the latter does not occur at all in regions of a small relative motion and it is only the bellows folds in the vicinity of the box-side connection of the bellows which perform the entire shifting motion of the rod. As a result, stresses higher than those on which the design was based will occur in this region with the possible consequence being a premature rupture of the bellows and, thus, a reduction in the service life of the bellows.

It is the object of the present invention to ensure for a lifting valve a reliable, hygienically proper, and durable static sealing of the connecting flange of the closing-member unit in the valve box under the occurring forces at an adequately long service life. In addition, a reliable indication of a bellows defect is intended to be ensured throughout the full service life of the bellows even for a bellows which tightly encircles the valve rod.

BRIEF SUMMARY OF THE INVENTION

The first measure consists in that the forces resulting from the valve-lift induced deformation of the bellows and/or the respective pressure in the box are absorbed where they are produced initially. An absorption free from bending moments of these forces is achieved in the proposed solution by the fact that the connecting flange of the closing-member unit, in the region of its connection to the bellows, has a fastening component indirectly supported on the box side which transmits the resultant forces from the bellows and the connecting flange into the box via the shortest path possible. This avoids the transmission of these forces. which has been necessary hitherto, as transverse forces through the connecting flange radially extending outwardly to the locking point in the region of which there are the conical sealing surface and the critical sealing gap. A bending moment applying a stress to the sealing gap does not virtually occur in the proposed solution. The fastening component which is proposed absorbs axial forces which are provoked, for example, by stretching the bellows into the closing position of the lifting valve or by negative pressures acting in the interior of the box against the environment of the lifting valve.

The second inventive measure consists in that the connecting flange, in the region of its conical sealing surface, is reduced to a minimal wall thickness meeting the strength-related requirements in the form of a diaphragm-shaped sealing element. This measure avoids the buildup of the ductile bellows material in the critical sealing region.

In order that the required bias and, hence, the required sealing contact with the complementary annular seating surface in the valve box, be maintained in the region of the diaphragm-shaped sealing element the proposed invention further provides that the diaphragm-shaped sealing element, on its side facing away from the conical sealing surface, has at least one biased elastic thrust ring which presses the sealing surface onto the complementary annular seating surface. The elastic thrust ring virtually acts like a spring which persistently keeps the conical sealing surface under a bias even in the event of the sealing material creeping in this point and, thus, reliably prevents the sealing gap from expanding with the drawbacks previously described involved.

An advantageous aspect of the bellows provides that the diaphragm-shaped sealing element in the form of a prolongation oriented towards the complementary annular seating surface is formed on a closing plate of the connecting flange, the closing plate radially originating from the inside of the bellows and radially extending outwardly, substantially in the form of a disk, in a plane perpendicular to the axis of the valve rod. Acting on the diaphragm-shaped sealing element formed in such a material-saving way is the biased elastic thrust ring. A "creep" of the bellows material in this region may be compensated, without any loss in sealing force, by the biased elastic thrust ring.

In order to definedly fix and support the diaphragm-shaped sealing element and the closing plate of the connecting flange in the box another embodiment provides for a supporting body which is accommodated in an upper box aperture of the box coaxially to the valve rod and is axially supported towards the interior of the box on a stop surface adjoining the upper box aperture and is also supported indirectly or directly in the opposed direction. In addition, the supporting body receives and partially encircles the thrust ring in a groove-shaped recess adjacent to the surface area of the upper box aperture. This measure and the aforementioned stop of the supporting body in the box ensure a defined bias of the thrust ring and, thus, a defined contact pressure of the diaphragm-shaped sealing element on the complementary annular seating surface in the box.

In addition, the supporting body assumes the task of supporting the closing plate of the connecting flange under forces acting from the inside to the outside. To this end, the closing plate and the supporting body are formed to be complementary to each other. If a force acts from the outside to the inside, e.g. because of a negative pressure in the box as against the environment of the lifting valve, the fastening component is supported, via a preferably positive-fit connection, on the side of the supporting body facing away from the closing plate.

In order to prevent the diaphragm-shaped sealing element from slipping out of its locked position between the annular seating surface in the box and the elastic thrust ring another aspect of the bellows provides that the prolongation of the diaphragm-shaped sealing element lengthens to become an annular collar extending towards the valve rod and widens to form a wedge and that the collar is accommodated between the supporting ring and the surface area of the upper box aperture.

Another aspect of the bellows proposes that the collar, as seen in the axial direction, should be applied to at the end side by an elastic thrust ring which is squeezed by the supporting ring in conjunction with the surface area of the upper box aperture. This measure causes the collar to be keyed in place between the supporting ring and the surface area of the upper box aperture.

In order to ensure that any leakages that might occur after all be discovered and that reinfections ensuing therefrom be avoided another aspect of the bellows according to the invention provides that a leakage cavity annularly encircling the collar should be formed in the surface area of the upper box aperture, which cavity is connected to the environment of the lifting valve via at least one joining duct.

A further embodiment forming an aspect of the fundamental inventive features of the proposed bellows provides that the diaphragm-shaped sealing element should be formed by the fact that a continuous groove engages and constricts the connecting flange on the side facing away from the sealing surface, and that the groove should receive at least one thrust ring which is adapted to be squeezed in the groove by means of a continuous thrust edge on a box top portion traversed by the valve rod.

In order to reduce local stresses inside the permanently elastic thrust ring an advantageous embodiment further provides that the thrust edge should be flanked on either side by a continuous annular balancing chamber each which directly widen the space defined by the groove.

For reasons of strength, efforts are made to configure the bellows as small as possible in diameter. In order to stabilize the bellows additionally, an advantageous aspect provides that this one and the fastening component joining it should be fitted, at the inside, with a valve rod bore which encircles the valve rod at a minimal play ensuring its functionality. This aspect causes the valve rod to impart an additionally stabilizing effect onto the bellows and the fastening component from inside.

With regard to the anchoring of the fastening component, the invention provides both embodiments releasable with no damage involved and embodiments releasable with a damage involved. In this context, all sufficiently known non-positive and/or positive forms of anchoring can be realized.

A particularly advantageous aspect which releasably anchors the fastening component in the top of the box releasably, on one hand, and in a positive-fit and non-positive fit connection, on the other, is provided if the fastening component is screwed into the top of the box by means of a screw thread, preferably an acme thread.

Another option of anchoring the fastening component in the top of the box is to provide a locked joint, i.e. a non-positive fit connection.

If a damage to or a destruction of the closing-member unit is considered acceptable or even desirable while it is being replaced in the aseptic lifting valve another aspect provides that the fastening component should be anchored by a hook-shaped or barb-shaped positive-fit connection in the top of the box. Such a solution is very cost-effective, as a rule. At this point, an assembly of the closing-member unit in the valve is very easy and poses no problems, but its disassembly is feasible, as a rule, only by damaging or destroying the closing-member unit, especially in the region of the fastening component. In this context, the suggestion is that the fastening component should be formed on the closing-plate side facing away from the bellows in the shape of several drawhooks which preferably are spaced uniformly across the circumference of the closing plate and concentrically encircle the valve rod and which back up their free hook-shaped ends on a supporting surface defined by an annular recess in the top of the box.

The proposed reinforcement durably supports the bellows fold region adjoining the rod and, thus, will prevent this area from bearing against the rod because of its flow. As a result, the relatively narrow gap will be maintained between the supported bellows fold and the rod, which causes the propping function of the rod to be provided as before and the stability of the bellows to be acted on in a way which is favourable in all.

According to a favourable aspect, a durable support of the bellows and, specifically, the bellow folds is achieved by the fact that the reinforcement consists of a material which is temperature-resistant, is of a low plastic ductility and has a low coefficient of friction towards the material of the rod. These imperative properties which include positive properties (temperature resistance and low coefficient of friction towards the material of the rod) which, as a rule is employed for the bellows (polytetrafluoroethylene), on one hand, and the decisive drawback of the bellows material, namely its relatively large plastic ductility, on the other narrow down the materials to be considered for the reinforcement. It is primarily metallic and ceramic materials and temperature-resistant plastic materials which are employed here.

In order to join the reinforcement to the bellows material in a relatively simple way in the course of the manufacturing process the suggestion is that the reinforcement should border the bellows fold from inside.

The possible ways suggested for connection between the material of the bellows and the material of the reinforcement either are a material-fit connection or a positive-fit and/or non-positive fit connection.

BRIEF DESCRIPTION OF THE SEVERAL VIEWS OF THE DRAWINGS

Embodiments of the invention are shown in the drawing and are now briefly described. In the drawings.

DETAILED DESCRIPTION OF THE INVENTION

Figure 1:
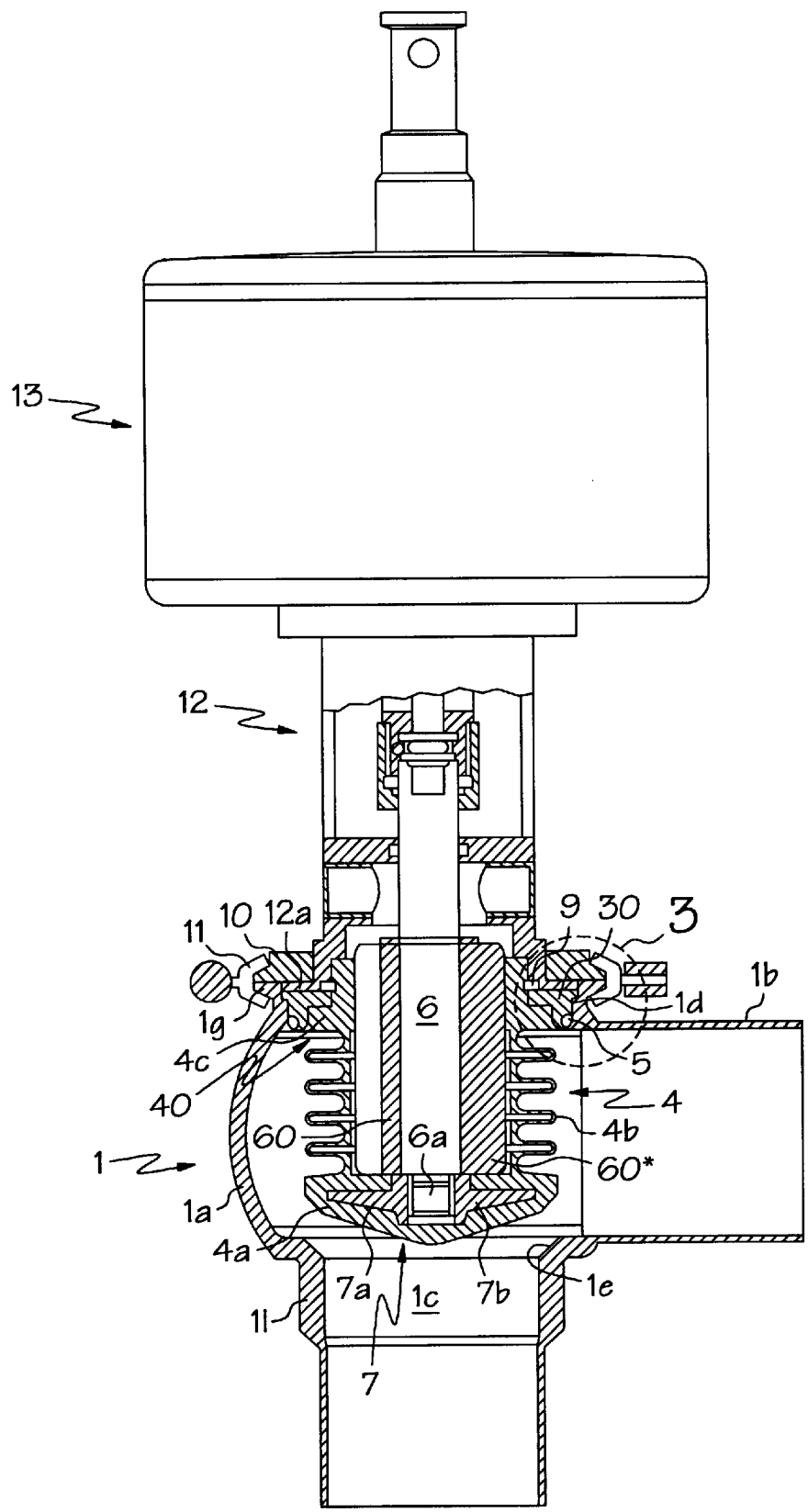
FIG. 1 shows a central section extending below the servo-drive through a lifting valve having a bellows of the generic type in conjunction with a connecting flange in a first embodiment.

While this invention may be embodied in many different forms, there are described in detail herein a specific preferred embodiment of the invention. This description is an exemplification of the principles of the invention and is not intended to limit the invention to the particular embodiment illustrated.

A lifting valve 1 (FIG. 1) has a box 1a which, as referred to the position illustrated, is provided with a lateral box connection 1b and a downwardly facing box connection 1l. The latter connects the interior of the box 1a, via a lower box aperture 1c, to another box portion (not shown) which is flanged below to the box 1a in case of need. Formed in the region where the box 1a transits to the lower box aperture 1c is a seating surface 1e which preferably is conical and faces the interior and interacts with an appropriate closing component 4a. The latter is rigidly connected to a valve rod 6 which is passed upwardly through the box 1a and a lantern 12 joining it and ends in a servo-drive 13 connected to the latter. The valve rod 6 is concentrically encircled by a bellows 4, a so-called expansion bellows, or even a so-called corrugated tube or a diaphragm as is known from EP 0 508 658 B1, each of these sealing elements which preferably are expandable in an axial direction being fastened, in a material-fit connection, to the closing component 4a, on one hand, and the connecting flange 40, on the other. The latter, amongst other things, comprises a closing plate 4c which has a protrusion which essentially is in the form of a disk and is oriented in a plane perpendicular to the axis of the valve rod 6 and radially extends from the inside of the bellows 4b, and which radially extends outwardly to a degree such as to allow, in conjunction with a corresponding upper box aperture 1d, the disassembly of a closing-member unit 4 which, apart from the connecting flange 40, consists of the closing component 4a and the bellows 4b, in an upward direction.

Figure 3:
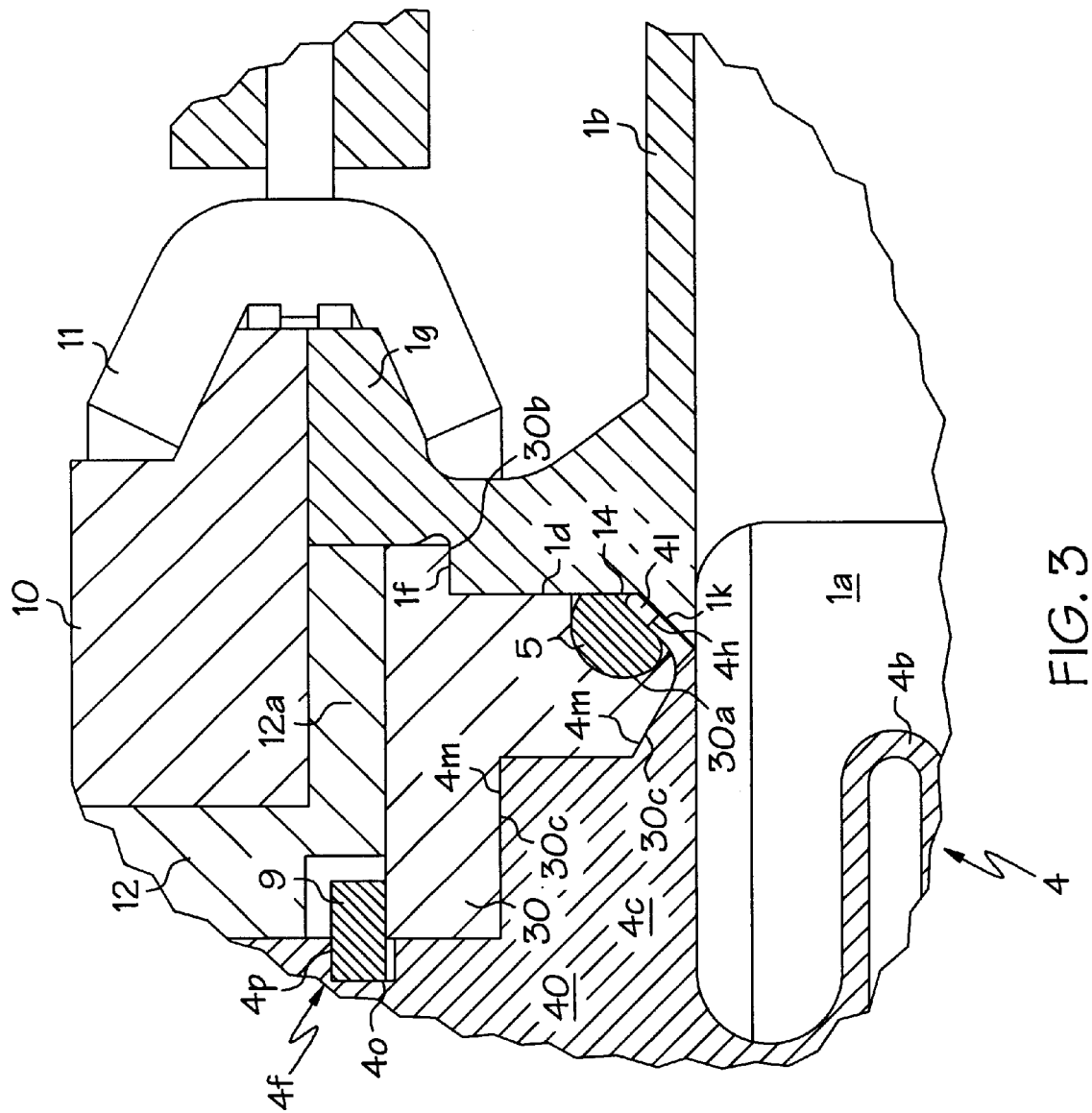
FIG. 3 shows an enlarged representation of a central section through the connecting flange of first embodiment in a region marked by the detail "X" in FIG. 1.

The disk-shaped closing plate 4c is radially reduced at the outside to a minimal wall thickness meeting the strength-related requirements in the form of a diaphragm-shaped sealing element 4l (cf. the enlarged representation shown in FIG. 3 of the region marked by the detail "X" in FIG. 1). The diaphragm-shaped sealing element 4l is formed in the shape of a prolongation oriented towards a complementary annular seating surface 1k (cf. especially FIG. 3) on the closing plate 4c in the box 1a and has a conical seating surface 4h cooperating with the annular seating surface 1k. The latter is pressed onto the complementary annular seating surface 1k via a biased elastic thrust ring 5 which is disposed on the side facing away from the conical seating surface 4h of the diaphragm-shaped sealing element 4l. The elastic thrust ring 5 is received by a groove-shaped recess 30a in a supporting body 30 and is enclosed, in an interaction with the surface area of the upper box aperture 1d, leaving out only that portion which is in contact with the diaphragm-shaped sealing element 4l. The supporting body 30 is received coaxially to the valve rod 6 in the upper box aperture 1d of the box 1a, and it axially bears towards the interior of the box 1a via a first supporting surface 30b on a stop surface 1f adjoining the upper box aperture 1d.

Thus, if the system is in a stressed condition the elastic thrust ring undergoes a defined bias with the metallic stop of the locking component, the supporting body 30. The supporting body 30 is embedded and bears against the stop surface 1f via a lantern flange 12a of the lantern 12 which is received and coaxially centered inside a box flange 1g. The positive-fit and non-positive fit embedding of the lantern flange 12 in the box flange 1g is performed by a locking flange 10, which is squeezed with the box flange 1g by means of a connecting element 11 e.g. a so-called tip-up ring. The supporting ring 30, proceeding from the recess 30a and as referred to its further range of radial extension, has a second supporting surface 30c which supports the complementary closing plate 4c with its first supporting surface 4m from outside as seen in an axial direction. This enables forces acting to the outside from the interior of the box 1a to be absorbed by the supporting body 12 and to be abducted into the box flange 1g and, thus, into the box 1a via the lantern flange 12a, the locking flange 10, and the connecting element 11. If the closing plate 4c is stressed in an inverse direction, i.e. to the inside from the outside, e.g. by stretching the bellows 4b into the closing position of the lifting, valve 1 or as a consequence of negative-pressure build-up in the interior of the box 1a, the forces resulting therefrom are transmitted from the fastening component 4f, via a securing element 9 engaging the latter in a positive-fit connection, to the supporting body 30 which if this direction of stress exists is supported onto the stop surface 1f on the box 1a directly via its first supporting surface 30b. To this end, the fastening component 4f has provided in it a securing groove 4o which rests on the securing ring 9 by a second supporting area 4p.

The closing component 4a (FIG. 1) has embedded in it a securing insert 7 which comprises a disk-shaped fastening plate 7a which radially extends far outwardly and a centric fastening socket 7b. The valve rod 6 is screwed into the fastening socket 7b by means of a threaded pin 6a.

In order to be sure that the diaphragm-shaped sealing element 4l is prevented from being torn out of its locked position between the annular seating surface 1k and the thrust ring 5 even in case of very extreme stresses a further development of the above described arrangement of FIG. 3 provides that the prolongation of the diaphragm-shaped sealing element 4l should lengthen to form a annular collar 4g extending towards the valve rod 6 (FIG. 4) while expanding so as to form a wedge, and that the collar 4g should be received between the supporting ring 30 and the surface area of the upper box aperture 1d. Thus, the collar 4g is of a wedge-like shape in its lower region so that if the diaphragm-shaped sealing element 4l is under a tensile stress directed towards the interior the collar 4g connected thereto is keyed between an annular recess 30d in the supporting body 30, which ends in a wedge-shaped surface 4h and the opposed surface area of the upper box aperture 1d. The wedge-shaped surface 4q is formed on a projection 30e which borders a part of the groove-shaped recess 30a for the elastic thrust ring 5.

Figure 4:
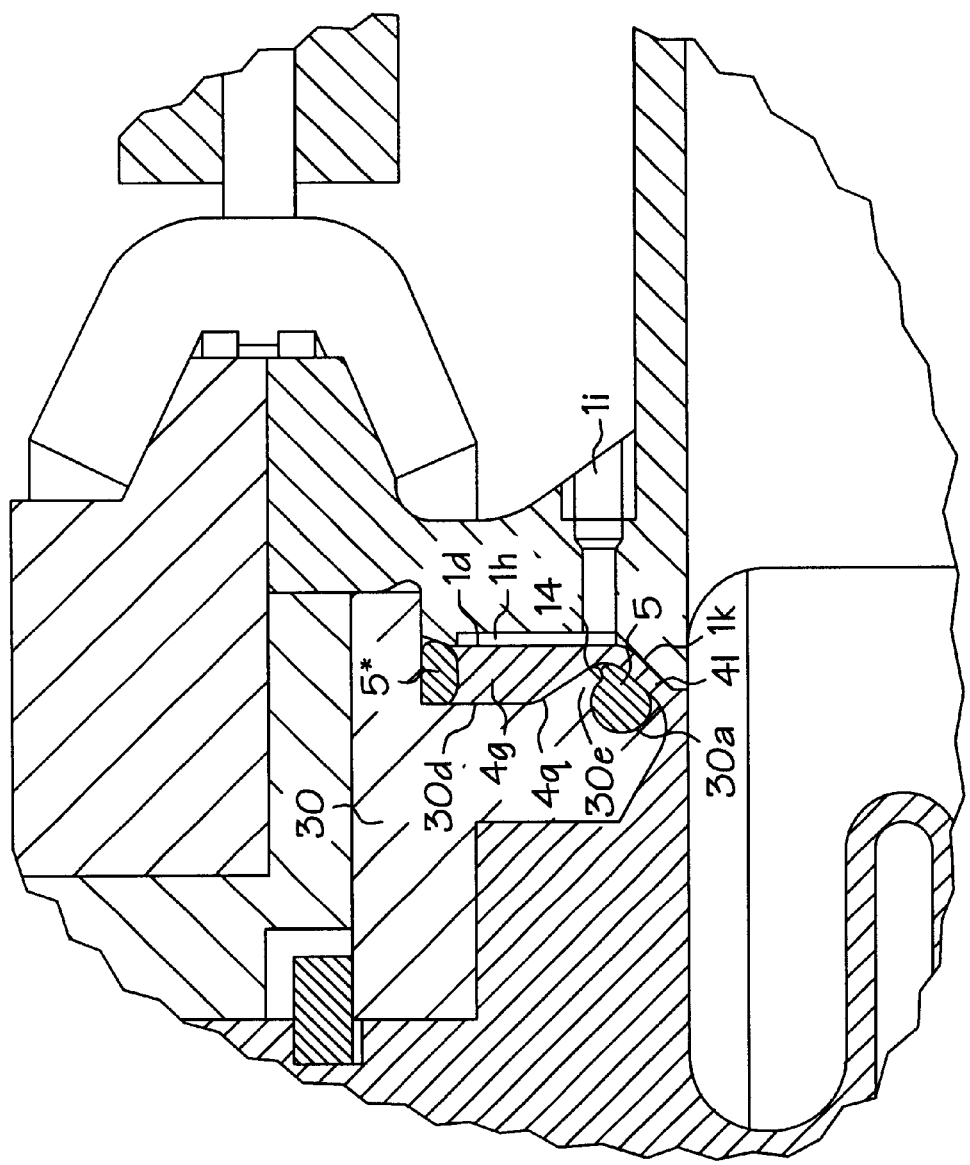
FIG. 4 also shows an enlarged representation of a central section through the connecting flange of the first embodiment according to FIG. 3 where the prolongation of the diaphragm-shaped sealing element lengthens to form a annular collar extending towards the valve rod region and, thus expands to form a wedge.

In order that the collar 4g be biased and keyed in place already in a condition free from operating forces in its environment embedding it is further provided that it should be applied to, at its end side as seen in an axial direction, by an elastic thrust ring 5* which is squeezed in place by the supporting ring 30 in conjunction with the surface area of the upper box aperture 1d (FIG. 4).

With a view to supervising and possibly removing leaks from the region between the diaphragm-shaped sealing element 4l and the elastic thrust ring 5* each of which is in a sealing contact with the annular seating surface 1k or the surface area of the upper box aperture 1d another suggestion provides that a leakage cavity 1h enclosing the collar 4g preferably in the form of a ring should be formed in the surface area of the upper box aperture 1d, which cavity is connected to the environment of the lifting valve 1 via at least one joining duct 1i.

Figure 2:
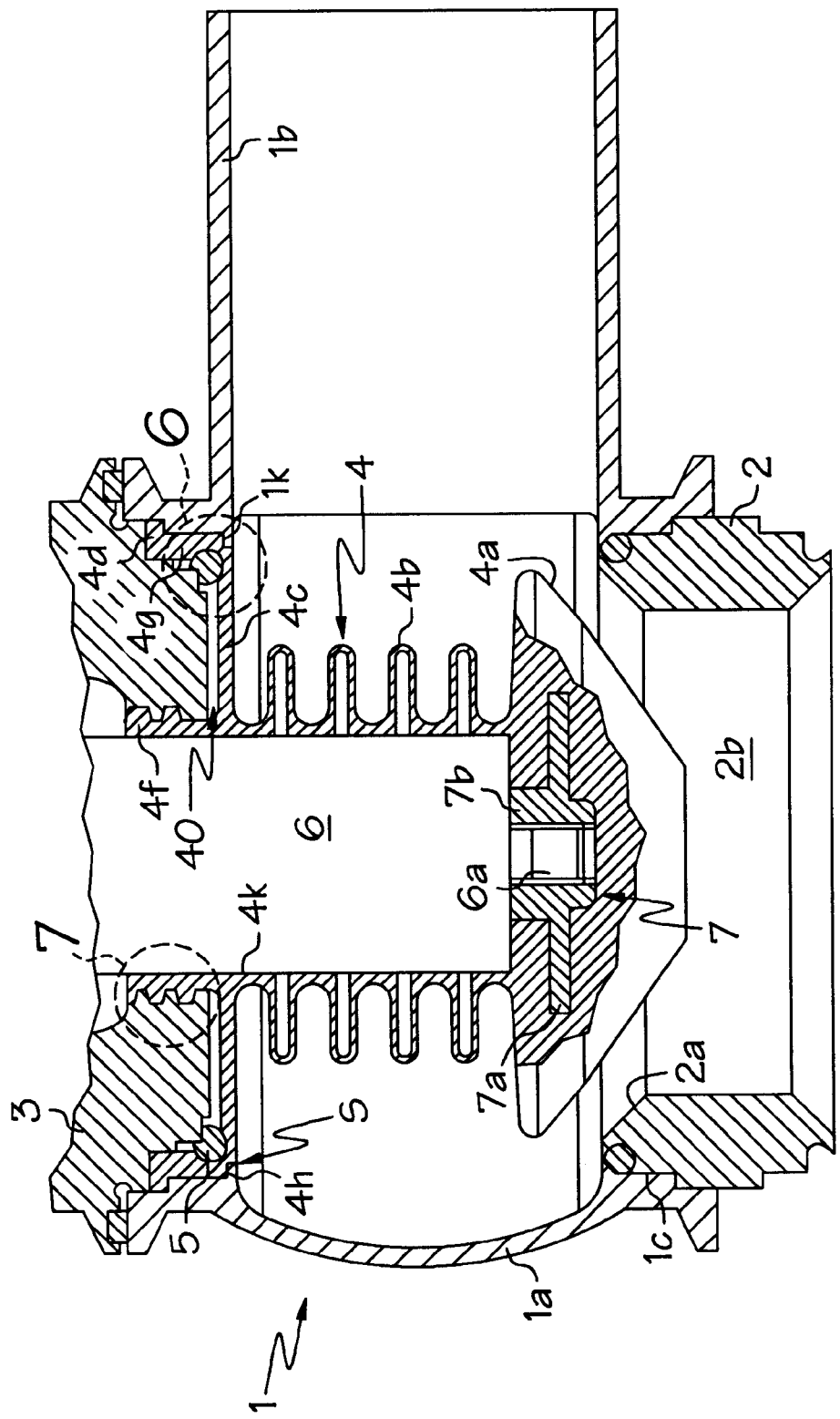
FIG. 2 shows a central section through a closing-member unit above the valve seat having a bellows of the generic type in conjunction with a connecting flange in a second embodiment.

FIG. 2 shows a lifting valve 1 which only is illustrated in part with the connecting flange 40 configured in a second fundamental embodiment. In contrast to the lifting valve 1 of FIG. 1, a lower box aperture 1c has sealingly inserted in it a seating ring 2 which connects the interior of the box 1a to a box portion flanged below to the box 1a in case of need via a communicating aperture 2b. The seating ring 2 has a seating surface 2a which preferably is conical and is directed to the interior of the box 1a and which cooperates with the closing component 4a. The rest of the structure of the lifting valve 1 is substantially identical to the one of FIG. 1 except for the shape of the connecting flange 40 which is described below and its way of embedding into the box 1a.

Figure 5:
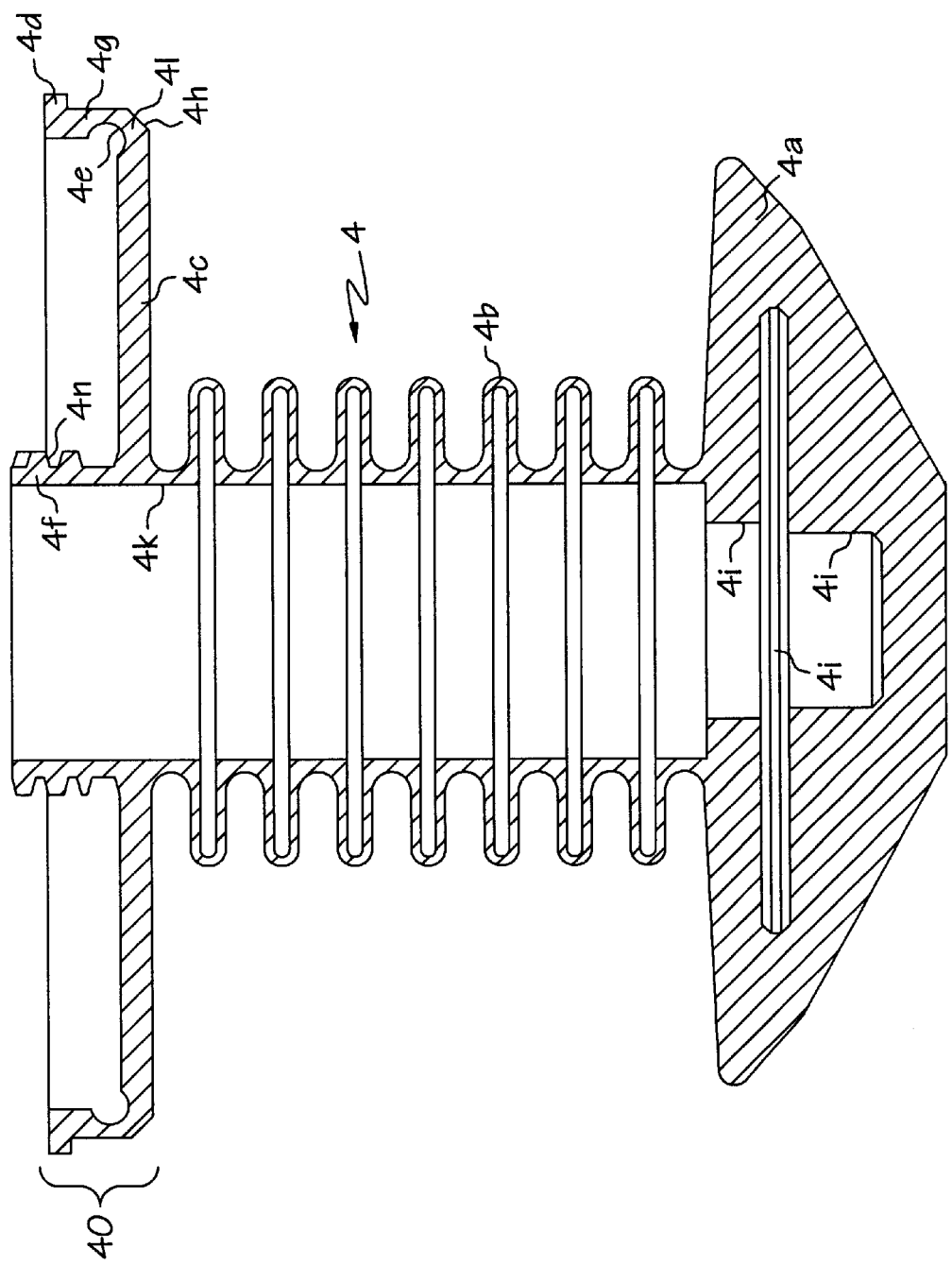
FIG. 5 also shows a central section through the closing-member unit of FIG. 2 for itself alone and in an enlarged representation.
Figure 6:
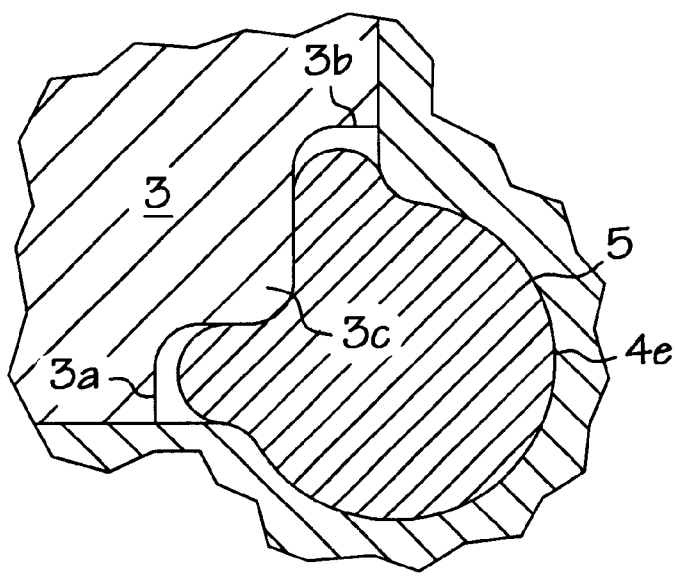
FIG. 6, in a very enlarged representation, shows a central section through the continuous groove, the continuous thrust edge at the top of the box, and the elastic thrust ring squeezed between the two components in a region marked by the detail "Z" in FIG. 2.

The first invention idea of the present invention refers to the region marked as the detail "Z" (FIG. 2) which is shown more distinctly in FIG. 6. Since a gradual variation in the shape of the connecting flange 40 defining a gap S with the box 1a has been unavoidable till this date in the region of its conical sealing surface 4h has been unavoidable hitherto under changing conditions of operation (pressure, temperature) for the material (PTFE) which is employed, as a rule, in designs according to the state of the art the diaphragm-shaped sealing element 4l formed on the connecting flange 40 at the outside radial end of the closing plate 4c (FIG. 5) is configured by causing a continuous groove 4c to engage and constrict the connecting flange 40 on the side facing away from the sealing surface 4h. The groove 4e accommodates at least one thrust ring 5 which, by means of a continuous thrust edge 3c (FIG. 6), is squeezed on a box portion 3 traversed by the valve rod 6 in the groove 4e.

The connecting flange 40 (FIG. 5) which is constricted to a minimal wall thickness meeting the strength-related requirements in the region of the conical sealing surface 4h via the groove 4e consists of a collar 4g extending towards the axis of the valve rod 6 which connects the substantially disk-shaped closing plate 4c oriented in a plane perpendicular to the axis of the valve rod and radially extending from the inside of the bellows 4b to a annular flange projection 4d disposed at the end of the connecting flange 40. The engagement of the groove 4e appropriately is so profound that the region which is left is made so thin as is just possible for reasons of safety.

As a consequence of the squeeze provoked by the thrust edge 3c, the permanently elastic thrust ring 5A is bulged out into a first and a second annular balancing chamber 3a and 3b, respectively, as is provided by an advantageous aspect (FIG. 6). The latter serve for reducing local stresses inside the permanently elastic thrust ring 5 in this region. A respective escaping motion of the thrust ring 5 as a consequence of a change in volume and a deformation will be ensured by the balancing space designated 14 there in the embodiment of FIGS. 3 and 4.

The permanently elastic thrust ring 5 (FIGS. 2, 5, 6), using its ability to reversibly change its shape, compensates the comparatively small deformations of the annular flange projection 4d and the adjoining collar 4g and, partially, even those of the closing plate 4c in this region, and it almost acts like an independently acting resetting device to permanently ensure the sealing action to conform to aseptic conditions between the conical sealing area 4h and the adjoining complementary annular seating surface 1k of the box 1a. As far as a durable bias of the diaphragm-shaped sealing element 4l is concerned on the associated annular seating surface 1k the mechanisms of action correspond to those of the first embodiment of FIGS. 1, 3, and 4.

If it proves to be opportune or necessary several of the aforementioned permanently elastic thrust rings 5 are disposed to permanently ensure the bias in the region of the continuous groove 4a as spread over the critical range.

The second idea of the invention as was addressed above is apparent from the region designated by the detail "Y" in FIG. 2. This detail "Y" is also shown in an enlarged representation in FIG. 5. To avoid a bending moment resulting from a couple of forces which is formed, for example, by a tensile force in the bellows 4b and the corresponding force of reaction in the region of the closing plate 4c the whole connecting flange 40 of the closing-member unit 4 is provided with a fastening component 4f anchored in the box top 3 in the region where it is connected to the bellows 4b. In the embodiment shown, the fastening component 4f is provided, at its outside, with a screw thread 4n, preferably an acme thread, via which a non-positive fit and a positive-fit connection is possible with the box top 3. This allows the tensile forces exerted by the expansion bellows 4b onto the closing plate 4c to be introduced directly into the box top 3 and to be absorbed there with no formation of a bending moment influencing the critical sealing gap S.

The bellows and the adjacent fastening component 41 are provided, at their inside, with a valve rod bore 4k which encircles the valve rod 6 at a minimal clearance ensuring, its functionality. This aspect gives the bellows 4b and the fastening component 4f additional stability from inside. An appropriate aspect within the scope of the first embodiment of the proposed invention is shown in FIG. 1. The bellows 4b (see the illustration on the right of the valve rod 6) is supported by a supporting component 60* here whereas the illustration on the left of the valve rod 6 shows a supporting component 60 which is encircled by the bellows 4b at a relative large clearance.

Figure 7:
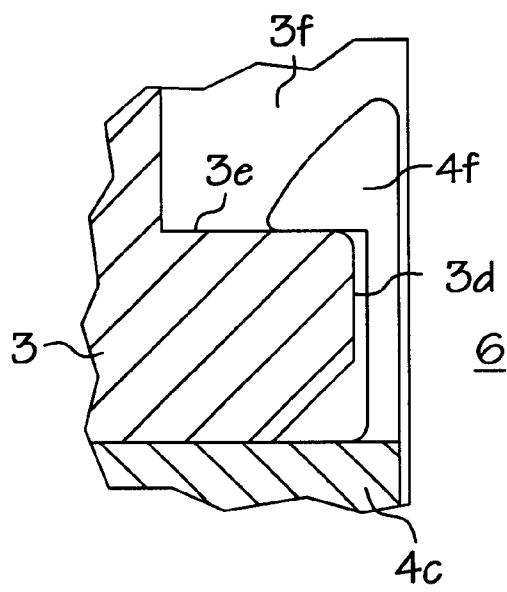
FIG. 7 shows a central section through the fastening component of the connecting flange at the point marked by the detail "Y" in FIG. 2 wherein the features of a solution differing from the aspect of Figure are illustrated in this region.

Another aspect in this range provides (FIG. 7) that the fastening component 4f should be configured in the form of several drawhooks which preferably are spaced across the circumference of the closing plate 4c and concentrically encircle the valve rod 6. The drawhooks 4f are formed like hooks at their free end and are supported on a supporting surface 3e which is defined by a recess 3f in the box top 3. In a favourable aspect, several of these drawhooks 4f are constituted by a cylinder-shaped elongation which extends on the side of the closing plate 4c which faces away from the bellows 4b. To make it possible to mount the closing plate 4c, in connection with the drawhook 4f, in an internal bore 3d in the box top 3, the cylinder-shaped continuation part constituting the drawhooks 4f is slotted at several points, preferably at equal spacings. After the drawhooks 4f are introduced into the recess 3f they are retained there by the valve rod 6 in their anchored position. Tensile forces provoked by a bellows 4b stretching in the closing position of the lifting valve 1 are now transmitted directly onto the box top 3 via the drawhooks 4f and the supporting surface 3e and are supported there so that no flexural stress occurs on the closing plate 4c with the concomitant consequences for the sealing gap S.

The above described effects and advantages of the drawhooks 4f are equally achieved if the closing-member unit configuration is according to the FIGS. 2 and 5 (positive-fit and non-positive-fit connection by means of a screw thread). In addition, other force transmissions are also possible, it having to be ensured in any other case that the tensile forces exerted by the bellows 4b while it is lengthened or the forces resulting from the respective pressure in the box (such as forces resulting from the negative pressure as against the ambient pressure of the lifting valve) are directly introduced into the box top 3. This can also be accomplished by means of barbs, other positive-fit connections such as the locking ring 9 in the complementary locking groove 4o (cf. FIGS. 1, 3, and 4) or an appropriate non-positive fit locking of the closing plate 4c in this region rather than by the above described bolted joint 4f of drawhooks.

If the possible fastening of the closing plate 4c in the above mentioned region is designed as a positive-fit connection there are two alternative options here again. The positive-fit connection may be designed as being releasable with no damage involved, on one hand, or as being releasable with a damage involved, on the other. In those instances where this destruction can be or will be put up with as planned if the closing-member unit 4 is exchanged the fastening can be designed, for example, as a non-releasable snap connection which will also be destroyed during the disassembly of the closing-member unit 4. In all of the other instances, this snap connection will be designed as being releasable. A glance at the configuration of the lifting valve of FIG. 1 shows that the closing-member unit 4 if drawhooks 4f are provided in the region concerned can be disassembled with no destruction involved if the valve rod 6 is initially removed from the valve-rod bore 4k of the closing-member unit 4 and the adjoining drawhook 4f is removed subsequently. Thereupon, the drawhooks 4f may be radially bent inwardly and may be removed from the bore 3d in the box top 3. If the fastening component 4f is configured in the form of a releasable bolted joint it will be no problem to disassemble it.

Figure 8:
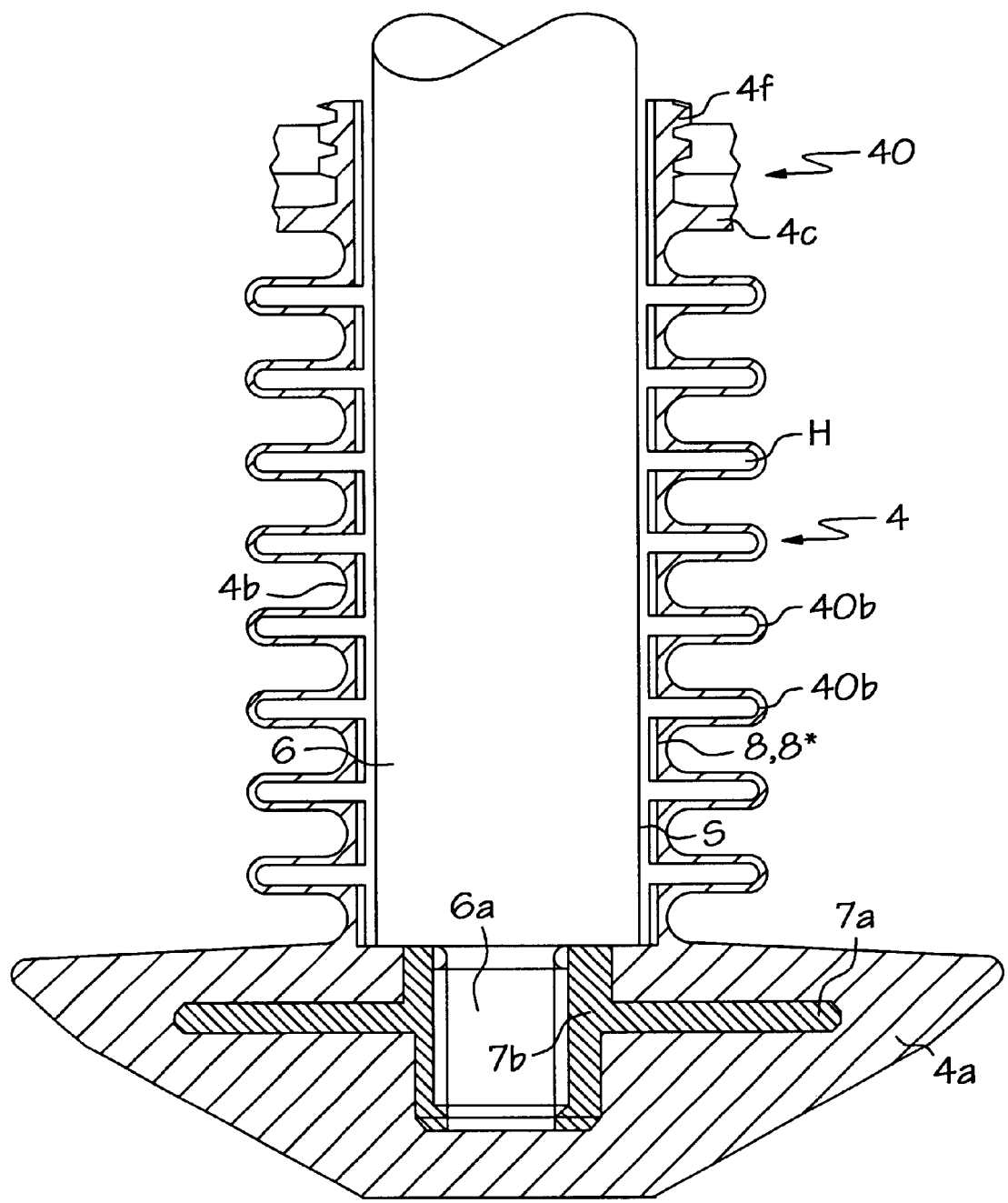
FIG. 8 shows a central section through the closing-member unit in one of the two fundamental embodiments with a reinforcement provided in the bellows region adjoining the rod.

FIG. 8 shows the closing-member unit 4 which was already described previously and, in its central portion comprises the bellows 4b which, at its end sides, is connected to a box-end connecting flange 40 each, on one hand, and the closing component 4a, on the other. The bellows 4b itself comprises a multiplicity of convex-shaped and concave-shaped bellows folds 40b which alternately are lined up in this configuration with each convex-bulged bellows fold 40b as referred to the bellows interior defining a cavity H. The closing-member unit 4 is coaxially traversed by the valve rod 6 which runs to end in a threaded pin 6a and, along with it, is screwed into the fastening socket 7b with the latter, like the fastening plate 7a, is embedded in a recess 4i in the closing component 4a (see also FIG. 5).

According to the invention, the suggestion is to provide an annular reinforcement 8 or 8* durably supporting this region in the region adjoining a bellows fold 40b. In the embodiment, the reinforcement 8 or 8* borders the bellows fold 40b from the inside. In the embodiment, the connection may then be realized as a material fit or a non-positive fit.

As far as the respective annular reinforcements 8, in this shape, are connected to the respective bellows fold 40b or are inserted in the material of the bellows fold or are moved to this one the reinforcements in question are given the reference number 8.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A lifting, valve, which is equipped with a closing component (4a) interacting with a valve-box end seating surface (1e; 2a) wherein the latter is connected, via a valve rod (6) led out of a box (1a), to a servo-drive (13), with a bellows (4b) for sealing the valve rod passage, formed as an expansion bellows or corrugated tube (4b) which coaxially encircles the valve rod (6) and which is connected to the closing component (4a) on one side and, at its free end, has a connecting flange (40) including a conical sealing surface (4h) on the other side which bears against a complementary annular seating surface (1k) of the box (1a), and wherein the closing component (4a), the bellows (4b), and its connecting flange (40) define an integral, exchangeable closing-member unit (4), characterized in that the connecting flange (40) of the closing-member unit (4), in the region where it is connected to the bellows (4b), has a fastening component (4f) indirectly supported on the box side to absorb, in a way free from bending moments to a very large extent, the forces resulting from the valve-lift induced deformation of the bellows (4b) and/or the respective pressure in the box (1a), and, in the region of its conical sealing surface (4h), is reduced to a minimal wall thickness meeting the strength-related requirements, in the form of a diaphragm-shaped sealing element (4l), and that the diaphragm-shaped sealing element (4l), on its side facing away from the conical sealing surface (4h)

has at least one biased elastic thrust ring (5) which presses the sealing surface (4h) onto the complementary annular seating surface (1k).

2. The lifting valve according to claim 1 characterized in that the diaphragm-shaped sealing element (4l) is shaped in the form of a prolongation oriented towards the complementary annular seating surface (1k) on a closing plate (4c) of the connecting flange (40) wherein the closing plate (4c) radially extends from the inside of the bellows (4b) and radially extends outwardly in a substantially disk-shaped form in a plane perpendicular to the axis of the valve rod (6).

3. The lifting valve according to claim 2, characterized in that a supporting body (30) is provided, which is received coaxially to the valve rod (6) in an upper box aperture (1d) of the box (1a) and is axially supported on a stop surface (1f) adjacent to the box aperture (1d) in the direction of the interior of the box (1a) and is also supported directly or indirectly on the box (1a) in the opposed direction, which receives and partially encircles the thrust ring (5) in a groove-shaped recess (30a) which adjoins the surface area of the box aperture (1d), which, extending from the recess (30a), supports the closing plate (4c) from outside in its further radial range of extension as seen in an axial direction, and which, radially at the inside, supports the first fastening component (4f) from inside, as seen in an axial direction, via a positive-fit connection.

4. The lifting valve according to claim 2, characterized in that the diaphragm-shaped sealing element (4) lengthens to form a annular collar (4g) extending in the direction of the valve rod (6) while widening to the shape of a wedge, and that the collar (4g) is received between the supporting ring (30) and the surface area of the box aperture (1d).

5. The lifting valve according to claim 4, characterized in that the collar (4g) as seen in an axial direction, is acted on at its end side by an elastic second thrust ring (5*) which is squeezed by the supporting ring (30) in conjunction with the surface area of the upper box aperture (1d).

6. The lifting valve according to claim 4, characterized in that the surface area of the upper box aperture (1d) has formed in it a leakage cavity (1h) annularly encircling the collar (4g) which is connected to the environment of the lifting valve (1) through at least one joining duct (1i).

7. The lifting valve according to claim 1, characterized in that the diaphragm-shaped sealing element (4l) is formed by the fact that a continuous groove (4e) engages and constrains the connecting flange (40) on the side facing away from the sealing surface (4h), and the groove (4e) receives at least one thrust ring (5) which is squeezed by means of a continuous thrust edge (3c) in the groove (4e) on a box top (3) traversed by the valve rod (6).

8. The lifting valve according to claim 7, characterized in that the thrust edge (3c) is flanked on either side by a continuous annular balancing chamber (3a and 3b, resp.) which directly widen the space defined by the groove (4e) and the thrust edge (3c).

9. The lifting valve according to claim 1, characterized in that this one and the fastening component (4f) which joins it are equipped, at their insides, with a valve rod bore (4k) which encircles the valve rod (6) at a minimal clearance ensuring its functionality.

10. The lifting valve according to claim 1, characterized in that the fastening component (4f) is releasably anchored, with a damage involved, indirectly or directly in the box (1a).

11. The lifting valve according to claim 1, characterized in that the fastening component (4f) is releasably anchored, with no damage involved, indirectly or directly in the box (1a).

12. The lifting valve according to claim 11, characterized in that the fastening component (4f) is anchored indirectly or directly in the box (1a) in a non-positive fit and/or a positive-fit connection.

13. The lifting valve according to claim 12, characterized in that the fastening component (4f) is screwed indirectly or directly into the box (1a), by means of an acme thread (1n).

14. The lifting valve according to claim 12, characterized in that the fastening component (4f) is anchored directly or indirectly in the box (1a) by a positive-fit securing element (9).

15. The lifting valve according to claim 14, characterized in that the fastening component (4f) is formed in the shape of several drawhooks spaced uniformly across the circumference of the closing plate (4c) on the side of the closing plate (4c) facing away from the bellows (4b), which drawhooks concentrically encircle the valve rod (6) and are supported, at their free ends formed as hooks, on a supporting surface (3e) which is defined by a annular recess (3f) in a box top (3) and the box (1a).

16. The lifting valve according to claim 12, characterized in that the fastening component (4f) is anchored indirectly or directly in the box (1a) by a hook-shaped or barb-shaped positive-fit connection.

17. The lifting valve according to claim 12, characterized in that the reinforcement (8, 8*) consists of a material which is temperature-resistant, is of a low plastic ductility, and has a low coefficient of friction towards the material of the rod (6).

18. The lifting valve according to claim 1, characterized in that the each region of a bellows fold (40b) adjoining the rod of the bellows (4b) has a reinforcement (8, 8*) which durablely supports this region in an annular way.

19. The lifting valve according to claim 18, characterized in that the reinforcement (8, 8*) borders the bellows fold (40b) from the inside.

20. The lifting valve according to claim 19, characterized in that the reinforcement (8, 8*) is connected to the material of the bellows (4b) in a positive-fit and/or non-positive fit connection.

21. The lifting valve according to claim 18, characterized in that the reinforcement (8, 8*) is connected to the material of the bellows (4b) in a material-fit connection.

* * * * *